(12) United States Patent
Song et al.

(10) Patent No.: US 10,207,536 B2
(45) Date of Patent: Feb. 19, 2019

(54) DRIVE WHEEL BEARING AND METHOD OF MANUFACTURING THE SAME

(71) Applicant: ILJIN GLOBAL CO., LTD., Seoul (KR)

(72) Inventors: Jae Myung Song, Seoul (KR); Yunho Jung, Seoul (KR); Wan Tae Kim, Seoul (KR)

(73) Assignee: ILJIN GLOBAL CO., LTD., Seoul (KR)

( * ) Notice: Subject to any disclaimer, the term of this patent is extended or adjusted under 35 U.S.C. 154(b) by 0 days.

(21) Appl. No.: 15/306,061

(22) PCT Filed: Feb. 17, 2015

(86) PCT No.: PCT/KR2015/001626
§ 371 (c)(1),
(2) Date: Oct. 21, 2016

(87) PCT Pub. No.: WO2015/163574
PCT Pub. Date: Oct. 29, 2015

(65) Prior Publication Data
US 2017/0043617 A1 Feb. 16, 2017

(30) Foreign Application Priority Data
Apr. 23, 2014 (KR) .......................... 10-2014-0048946

(51) Int. Cl.
*F16D 3/18* (2006.01)
*B60B 27/00* (2006.01)
(Continued)

(52) U.S. Cl.
CPC ...... *B60B 27/0005* (2013.01); *B60B 27/0042* (2013.01); *B60B 27/065* (2013.01);
(Continued)

(58) Field of Classification Search
CPC .............. B60B 27/005; B60B 27/0015; B60B 27/0021; B60B 27/0031; Y10T 29/49689;
(Continued)

(56) References Cited

U.S. PATENT DOCUMENTS

| 4,460,058 A | 7/1984 | Welschof et al. |
| 4,893,960 A | 1/1990 | Beier et al. |

(Continued)

FOREIGN PATENT DOCUMENTS

| CN | 202345281 U | 7/2012 |
| EP | 2042755 A2 | 4/2009 |

(Continued)

OTHER PUBLICATIONS

International Search Report dated May 20, 2015 in PCT Application No. PCT/KR2015/001626.
(Continued)

*Primary Examiner* — Jason L Vaughan
(74) *Attorney, Agent, or Firm* — Plumsea Law Group, LLC

(57) ABSTRACT

Disclosed are a drive wheel bearing and a method of manufacturing the same. The drive wheel bearing includes: a wheel hub which is integrally and rotatably fastened to a vehicle wheel; an inner race which is fitted with the wheel hub and integrally and rotatably coupled to the wheel hub; an outer race which rotatably supports the wheel hub and the inner race in a state in which the wheel hub and the inner race are fitted into the outer race; rolling elements which are interposed between the outer race and the wheel hub and between the outer race and the inner race; and a constant velocity joint which is integrally and rotatably connected to the wheel hub or the inner race by means of a face spline in order to receive power from an engine and transmit the received power to the vehicle wheel, in which the face spline (Continued)

of each of the wheel hub and the constant velocity joint have a structure in which teeth having the same size and tooth grooves having the same size radially extend, and are alternately and continuously arranged in a circumferential direction, and as a result, it is possible to smoothly transmit rotational power of the engine to the vehicle wheel through the wheel bearing.

2 Claims, 11 Drawing Sheets

(51) Int. Cl.
  *B60B 27/06* (2006.01)
  *B60B 35/12* (2006.01)
  *B60B 35/18* (2006.01)
  *F16C 19/18* (2006.01)
  *F16C 33/58* (2006.01)
  *F16C 35/063* (2006.01)
  *F16L 3/18* (2006.01)

(52) U.S. Cl.
  CPC .............. *B60B 35/12* (2013.01); *B60B 35/18* (2013.01); *F16C 33/586* (2013.01); *F16C 35/063* (2013.01); *B60B 2310/208* (2013.01); *B60B 2310/224* (2013.01); *B60B 2310/228* (2013.01); *B60B 2310/231* (2013.01); *B60B 2310/234* (2013.01); *B60B 2310/54* (2013.01); *F16C 19/186* (2013.01); *F16C 19/187* (2013.01); *F16C 2326/02* (2013.01); *F16L 3/18* (2013.01)

(58) Field of Classification Search
  CPC ......... Y10T 29/49686; Y10T 29/49707; B23P 15/003; F16C 33/581; F16C 33/64
  See application file for complete search history.

(56) References Cited

U.S. PATENT DOCUMENTS

| | | | |
|---|---|---|---|
| 5,575,568 A | | 11/1996 | Rigaux et al. |
| 5,720,102 A * | | 2/1998 | McClanahan ............. F16C 3/03 |
| | | | 156/289 |
| 5,878,496 A * | | 3/1999 | Liu .......................... B21K 1/04 |
| | | | 148/906 |
| 5,969,518 A | | 10/1999 | Merklein et al. |
| 6,665,936 B1 * | | 12/2003 | Kochsiek ................ F16D 3/223 |
| | | | 29/557 |
| 6,718,636 B1 * | | 4/2004 | Kochsiek ................ F16D 3/223 |
| | | | 29/557 |
| 7,637,819 B2 * | | 12/2009 | Feichter .................. F16D 3/227 |
| | | | 464/146 |
| 2003/0115755 A1 * | | 6/2003 | Frantzen ............... B23P 11/005 |
| | | | 29/898.064 |
| 2007/0072687 A1 * | | 3/2007 | Feichter .................. F16D 3/227 |
| | | | 464/145 |
| 2009/0097792 A1 | | 4/2009 | Kamikawa et al. |
| 2009/0148090 A1 * | | 6/2009 | Hudson .................. B21D 53/10 |
| | | | 384/492 |
| 2009/0176585 A1 * | | 7/2009 | Szentmihalyi .......... F16D 3/224 |
| | | | 464/106 |
| 2009/0252447 A1 * | | 10/2009 | Hirai ....................... B60B 27/00 |
| | | | 384/513 |
| 2011/0077089 A1 | | 3/2011 | Hirai et al. |
| 2012/0047740 A1 | | 3/2012 | Shirakami et al. |
| 2014/0100044 A1 | | 4/2014 | Kimura et al. |
| 2015/0054334 A1 | | 2/2015 | Song et al. |

FOREIGN PATENT DOCUMENTS

| | | |
|---|---|---|
| FR | 2605557 A1 | 4/1988 |
| FR | 2980829 A1 | 4/2013 |
| GB | 2097734 A | 11/1982 |
| JP | 63184501 A | 7/1988 |
| JP | 2001150906 A | 6/2001 |
| JP | 2001191717 A | 7/2001 |
| JP | 2006347544 A | 12/2006 |
| JP | 2007271044 A | 10/2007 |
| JP | 2009115292 A | 5/2009 |
| JP | 2009241615 A | 10/2009 |
| JP | 2009292422 A | 12/2009 |
| JP | 201083432 A | 4/2010 |
| JP | 2012045612 A | 3/2012 |
| JP | 2012206641 A | 10/2012 |
| JP | 2012245946 A | 12/2012 |
| JP | 2013000781 A | 1/2013 |
| JP | 2013035338 A | 2/2013 |
| JP | 2013146769 A | 8/2013 |
| KR | 1020070072565 A | 7/2007 |
| WO | 2008142988 A1 | 11/2008 |
| WO | 2013151195 A1 | 10/2013 |

OTHER PUBLICATIONS

European Search Report for EP application 15783301 dated Jan. 4, 2018.
CN Office Action dated Jan. 30, 2018 in CN Application No. 201580022043.
JP Office Action dated Nov. 17, 2017 in JP Application No. 2017507654.
Office Action dated Jul. 10, 2018 in counterpart Japanese Patent Application No. 2017-507654 (Machine Translation).

* cited by examiner

SECT. Z-Z(2:1)

<Hub>

<Constant velocity joint>

DRIVE WHEEL BEARING AND METHOD OF MANUFACTURING THE SAME

CROSS-REFERENCE TO RELATED APPLICATION(S)

This application is the U.S. National Phase application of PCT application number PCT/KR2015/001626 having a PCT filing date of Feb. 17, 2015, which claims priority of Korean patent application 10-2014-0048946 filed on Apr. 23, 2014, the disclosures of which are hereby incorporated by reference.

TECHNICAL FIELD

The present invention relates to a drive wheel bearing, and more particularly, to a drive wheel bearing in which a wheel hub or an inner race of a wheel bearing is coupled to a constant velocity joint via a face spline, and a method of manufacturing the drive wheel bearing.

BACKGROUND OF RELATED ART

In general, a wheel bearing, which is used for a vehicle, serves to mount a vehicle wheel to a vehicle body so that the vehicle wheel of the vehicle may smoothly rotate without a frictional loss.

Further, a power transmission device for a vehicle, which transmits power produced by an engine of the vehicle to the vehicle wheel, typically has a constant velocity joint.

When the vehicle rebounds while traveling or the vehicle turns, the constant velocity joint serves to smoothly transmit power of the engine to the vehicle wheel while absorbing displacement in a diameter direction, displacement in an axial direction, or displacement of moment of force from the vehicle wheel.

Recently, fuel economy of the vehicle is required to be improved so as to save resources and reduce emission of pollutants. To meet these requirements, there is proposed a power transmission structure of the power transmission device for a vehicle in which the constant velocity joint is connected directly to the wheel bearing for rotatably supporting the vehicle wheel in order to improve assembly properties and maintainability as well as weight reduction.

FIG. 1 illustrates an example of a drive wheel bearing in which a constant velocity joint is integrally and rotatably coupled to a wheel bearing so as to correspond to the aforementioned power transmission structure.

A constant velocity joint 20 is penetratively inserted into a wheel bearing 10, and the wheel bearing 10 and the constant velocity joint 20 are integrally and rotatably coupled by means of a spline 30.

The wheel bearing 10 includes a wheel hub 12 which is integrally and rotatably fastened to a non-illustrated vehicle wheel, an outer race 14 which is positioned radially outside the wheel hub 12 so as to rotatably support the wheel hub 12 and fastened to and supported by a fixing body such as a vehicle body or a knuckle, an inner race 16 which is integrally and rotatably mounted to the wheel hub 12 by being fitted with an outer circumferential surface of the wheel hub 12, and rolling elements 18 which are interposed between the wheel hub 12 and the outer race 14 and between the inner race 16 and the outer race 14 and enable the wheel hub 12 and the inner race 16 to rotate relative to the outer race 14.

The constant velocity joint 20 penetrates the wheel hub 12, and is integrally and rotatably coupled to the inner circumferential surface of the wheel hub 12 by means of the spline 30. Further, a locking nut 40 is coupled to an axially outer tip portion of the constant velocity joint 20 in order to prevent the wheel hub 12 and the constant velocity joint 20 from being separated in the axial direction.

The spline 30 include teeth and tooth grooves circumferentially, alternately, and continuously formed on an outer circumferential surface of a shaft portion of the constant velocity joint 20 which is mounted to the wheel hub 12 by being fitted with the wheel hub 12. Further, the spline 30 include teeth and tooth grooves alternately and continuously formed on an inner circumferential surface of the wheel hub 12 with which the shaft portion of the constant velocity joint 20 is fitted.

Therefore, when the teeth of the constant velocity joint 20 are inserted into and coupled to the tooth grooves of the wheel hub 12, and the teeth of the wheel hub 12 are inserted into and coupled to the tooth grooves of the constant velocity joint 20, the wheel hub 12 and the constant velocity joint 20 are coupled to be integrally rotatable in the circumferential direction through the engagement between the teeth and the tooth grooves.

Therefore, rotational power of the engine is transmitted to the vehicle wheel via the constant velocity joint 20 through the wheel hub 12 of the wheel bearing 10.

However, in the coupling structure between the wheel bearing and the constant velocity joint in the related art, a predetermined clearance necessarily needs to be present between the teeth in order to couple the wheel hub and the constant velocity joint by means of the spline. As a result, there is a problem in that when a load, which is generated when the vehicle is driven, is applied to the coupling portion between the wheel hub and the constant velocity joint, the clearance is increased, noise is generated, a degree of design freedom deteriorates due to the spline coupling portion, and weight reduction is difficult to be realized due to the spline coupling portion of the constant velocity joint.

SUMMARY OF INVENTION

The present invention has been made in an effort to provide a drive wheel bearing in which a wheel hub or an inner race is integrally and rotatably coupled to a constant velocity joint by means of a face spline such that power of an engine may be smoothly transmitted to a vehicle wheel through the constant velocity joint and the wheel bearing, and a method of manufacturing the drive wheel bearing.

Technical Solution

An exemplary embodiment of the present invention provides a drive wheel bearing including: a wheel hub which is integrally and rotatably fastened to a vehicle wheel, has a face spline formed on one tip portion, and includes a cylindrical portion having an outer circumferential surface; an inner race which is integrally and rotatably coupled to the wheel hub by being fitted with the outer circumferential surface of the wheel hub; an outer race which is positioned radially outside the wheel hub and the inner race and rotatably supports the wheel hub and the inner race; rolling elements which are interposed between the outer race and the wheel hub and between the outer race and the inner race; and a driving member which has a face spline integrally and rotatably coupled to the face spline of the wheel hub in order to receive power from an engine and transmit the received power to the vehicle wheel through the wheel hub, in which the face spline of each of the wheel hub and the driving member have a structure in which teeth having the same size and tooth grooves having the same size radially extend, are alternately and continuously arranged in a circumferential direction, and mesh with each other without clearances.

A threaded portion may be formed on the outer circumferential surface of the wheel hub, and a nut may be fastened to the threaded portion in order to prevent the inner race, which is fitted with and coupled to the outer circumferential surface of the wheel hub, from being separated axially.

Another exemplary embodiment of the present invention provides a drive wheel bearing including: a wheel hub which is integrally and rotatably fastened to a vehicle wheel, and includes a cylindrical portion having an outer circumferential surface; an inner race which is integrally and rotatably coupled to the wheel hub by being fitted with the outer circumferential surface of the wheel hub, and includes a cylindrical portion having a face spline formed on one tip portion thereof; an outer race which is positioned radially outside the wheel hub and the inner race and rotatably supports the wheel hub and the inner race; rolling elements which are interposed between the outer race and the wheel hub and between the outer race and the inner race; and a driving member which has a face spline integrally and rotatably coupled to the face spline of the inner race in order to receive power from an engine and transmit the received power to the vehicle wheel, in which the face spline of each of the inner race and the driving member have a structure in which teeth having the same size and tooth grooves having the same size radially extend, are alternately and continuously arranged in a circumferential direction, and mesh with each other without clearances.

A stepped portion, which is stepped radially inward, may be formed on the outer circumferential surface of the cylindrical portion of the wheel hub, an axial spline may be formed on the stepped portion, an axial spline, which correspond to the axial spline of the wheel hub when the stepped portion is coupled to an inner circumferential surface of the inner race in a press-fit manner, may be formed on the inner circumferential surface of the inner race, and the respective axial spline may have teeth and tooth grooves which axially extend and are alternately arranged in the circumferential direction.

Yet another exemplary embodiment of the present invention provides a drive wheel bearing including: a wheel hub which is fastened to a vehicle wheel so as to be rotatable integrally with the vehicle wheel; an inner race which is integrally and rotatably coupled to the wheel hub by being fitted with an inner circumferential surface of the wheel hub, and includes a cylindrical portion having a face spline formed on one tip portion thereof; an outer race which is positioned radially outside the wheel hub and the inner race and rotatably supports the wheel hub and the inner race; rolling elements which are interposed between the outer race and the wheel hub and between the outer race and the inner race; and a driving member which has a face spline integrally and rotatably coupled to the face spline of the inner race in order to receive power from an engine and transmit the received power to the vehicle wheel, in which the face spline of each of the inner race and the driving member have a structure in which teeth having the same size and tooth grooves having the same size radially extend, are alternately and continuously arranged in a circumferential direction, and mesh with each other without clearances.

A stepped portion, which is stepped radially inward, may be formed on an outer circumferential surface of the cylindrical portion of the inner race, an axial spline may be formed on the stepped portion, an axial spline, which correspond to the axial spline of the inner race when the stepped portion is coupled to an inner circumferential surface of the wheel hub in a press-fit manner, may be formed on the inner circumferential surface of the wheel hub, and the respective axial spline may have teeth and tooth grooves which axially extend and are alternately arranged in the circumferential direction.

An orbital forming portion may be formed on the other tip surface of the cylindrical portion of the inner race in order to prevent the inner race and the wheel hub from being separated axially.

A pressure angle of each of the teeth may be 30° to 45°.

A tooth angle of a top land of each of the teeth with respect to a vertical axis of each of the teeth and a tooth angle of a bottom land of each of the teeth with respect to the vertical axis may be 0.5° to 5.0°.

A tooth groove depth of the tooth groove may be at least 1.0 mm to 3.0 mm.

A tooth height may be 2 mm or greater in a section from a portion, where a tooth length ratio which is a ratio between a tooth length from a radially inner end of the tooth to a predetermined point along a tooth length in a radially outward direction and a tooth length from the predetermined point to a radially outer end along a tooth length is 1.5 or more, to the radially outer end of the tooth.

A gap between the tooth of the face spline of the wheel hub or the driving member and a bottom surface of the tooth groove of the face spline of the driving member or the wheel hub may be 0.2 mm to 0.7 mm in a state in which the tooth of the face spline of the wheel hub and the tooth of the face spline of the driving member are inserted into and coupled to the tooth groove of the face spline of the driving member and the tooth groove of the face spline of the wheel hub, respectively.

Curved surfaces may be formed at a ridge and a trough of the tooth, respectively, and a radius of curvature of the curved surface may be 0.7 mm or smaller.

A face spline portion including the tooth and the tooth groove may have a hardened portion formed through a heat treatment.

The hardened portion may be heat treated to have Rockwell hardness of about 30 to 60 HRC.

A hardening depth of the hardened portion may be up to 4 mm, an effective hardening depth may be 2.5 to 4 mm, and a hardening depth at a trough may be 2 mm or greater.

The driving member may include a constant velocity joint which receives power from the engine.

The constant velocity joint may have a mouth portion inserted into the cylindrical portion of the wheel hub, a fastening groove, which has screw threads and extends axially, may be formed in the mouth portion, a fastening bolt may be inserted through the cylindrical portion of the wheel hub and thread-fastened to the fastening groove of the mouth portion, and a bolt head of the fastening bolt may be fastened to be caught by an axially outer tip surface formed on the inner circumferential surface of the cylindrical portion of the wheel hub.

Still another exemplary embodiment of the present invention provides a method of manufacturing a drive wheel bearing, the method including: a first step of manufacturing a firstly preformed wheel hub by forming a radially extending flange, a pilot, and a cylindrical portion opened at both opposite sides; a second step of forming a secondly preformed wheel hub by forming a face spline having teeth and tooth grooves on one tip surface of the cylindrical portion of the firstly preformed wheel hub; a third step of forming a thirdly preformed wheel hub by forming a threaded portion on an outer circumferential surface of the secondly preformed wheel hub, and performing turning machining on an outer circumferential surface and an inner circumferential surface of the pilot; a fourth step of forming a fourthly preformed wheel hub by heat treating an outer circumferential surface of the thirdly preformed wheel hub in order to improve hardness and strength; a fifth step of forming a fifthly preformed wheel hub by drilling for forming a fastening hole that penetrates the flange, tapping for forming screw threads in the fastening hole, and turning machining a part of the outer circumferential surface of the pilot and a part of the inner circumferential surface of the cylindrical portion; and a sixth step of grinding an inner raceway, on which a rolling element is seated and supported, on the outer circumferential surface of the cylindrical portion, and superprecisely finishing the inner raceway.

The first step may include a hot forging process of heating a material at a predetermined temperature and forming the material by using a hot forging die.

The second step may include a cold forging process of forming a material by using a cold forging die.

The heat treatment of the fourth step may be a high frequency heat treatment.

The heat treatment of the fourth step may be performed on the face spline and a portion from the outer circumferential surface of the cylindrical portion to a part of the flange in an axial direction, such that a hardened portion is formed on the outer circumferential surface of the cylindrical portion.

Still yet another exemplary embodiment of the present invention provides a method of manufacturing a drive wheel bearing, the method including: a first step of forming a firstly preformed inner race having a cylindrical portion opened at opposite sides; a second step of forming a secondly preformed inner race by forming a face spline having teeth and tooth grooves on one tip surface of the cylindrical portion of the firstly preformed inner race; a third step of forming a thirdly preformed inner race by performing turning machining on an inner circumferential surface and an outer circumferential surface of the cylindrical portion which are positioned at the opposite side to the face spline of the secondly preformed inner race; a fourth step of forming a fourthly preformed inner race by broaching an axial spline on the inner circumferential surface of the thirdly preformed inner race; a fifth step of forming a fifthly preformed inner race by improving strength, hardness, and toughness by heat treating the fourthly preformed inner race; a sixth step of forming a sixthly preformed inner race by performing width flat surface grinding in order to ensure flatness of a large end surface and a small end surface of the cylindrical portion; a seventh step of forming a seventhly preformed inner race by forming a hardened portion on the outer circumferential surface of the cylindrical portion through a heat treatment; an eighth step of forming an eighthly preformed inner race by grinding the inner circumferential surface of the cylindrical portion; and a ninth step of grinding an inner raceway on the cylindrical portion and superprecisely finishing the inner raceway.

The first step may include a hot forging process of heating a material at a predetermined temperature and forming the material by using a hot forging die.

The second step may include a cold forging process of forming a material by using a cold forging die.

The heat treatment of the fifth step may be quenching and a tempering heat treatment.

The heat treatment of the seventh step may be a high frequency heat treatment.

The eighth step may include reprocessing the spline by using a broaching tool made of a special material in order to prevent thermal deformation of a spline portion of the inner race caused by the heat treatments of the fifth and seventh steps.

A further exemplary embodiment of the present invention provides a method of manufacturing a drive wheel bearing, the method including: a first step of forming a firstly preformed inner race having a cylindrical portion opened at opposite sides; a second step of forming a secondly preformed inner race by forming a face spline having teeth and tooth grooves on one tip surface of the cylindrical portion of the firstly preformed inner race; a third step of forming a thirdly preformed inner race by performing turning machining on an inner circumferential surface and an outer circumferential surface of the cylindrical portion which are positioned at the opposite side to the face spline of the secondly preformed inner race; a fourth step of forming a fourthly preformed inner race by processing axial spline on the outer circumferential surface of the thirdly preformed inner race; a fifth step of forming a fifthly preformed inner race by improving strength, hardness, and toughness by heat treating the fourthly preformed inner race; a sixth step of forming a sixthly preformed inner race by finish grinding a deformed portion after the heat treatment of the inner circumferential surface and the outer circumferential surface of the cylindrical portion; a seventh step of forming a seventhly preformed inner race by performing width surface grinding in order to ensure flatness of a large end surface and a small end surface of the cylindrical portion; and an eighth step of grinding an outer diameter of the cylindrical portion and an inner raceway, and superprecisely finishing the inner raceway.

The first step may include a hot forging process of heating a material at a predetermined temperature and forming the material by using a hot forging die.

The second step may include a cold forging process of forming a material by using a cold forging die.

The fourth step may include a rolling process of forming the axial spline.

The heat treatment of the fifth step may be a high frequency heat treatment.

Advantageous Effects

According to the drive wheel bearing and the method of manufacturing the same according to the exemplary embodiment of the present invention, the wheel bearing and the constant velocity joint are integrally and rotatably coupled by means of the face spline formed on the axially inner tip surface of the wheel hub or the inner race and the face spline formed on the axially outer tip surface of the constant velocity joint which faces the axially inner tip surface of the wheel hub or the inner race, and as a result, it is possible to smoothly transmit power of the engine to the vehicle wheel through the constant velocity joint and the wheel bearing.

The teeth and the tooth grooves, which constitute the face spline of the wheel hub or the inner race, have the same sizes as the teeth and the tooth grooves which constitute the face spline of the constant velocity joint, and as a result, force, which is applied to each of the teeth during a process of transmitting power from the constant velocity joint to the wheel hub or the inner race, is uniformly distributed. Therefore, it is possible to prevent crack or damage to the face spline, and to stably transmit torque of the engine to the wheel bearing.

The face spline of the wheel hub or the inner race and the face spline of the constant velocity joint are made of high carbon steel, and appropriately heat treated to have high hardness of 30 to 60 HRC, such that durability is excellent since strength of the teeth of the face spline is increased due to the heat treatment, and a service life may be extended.

DETAILED DESCRIPTION

Hereinafter, exemplary embodiments of the present invention will be described in detail with reference to the accompanying drawings.

Figure 1:
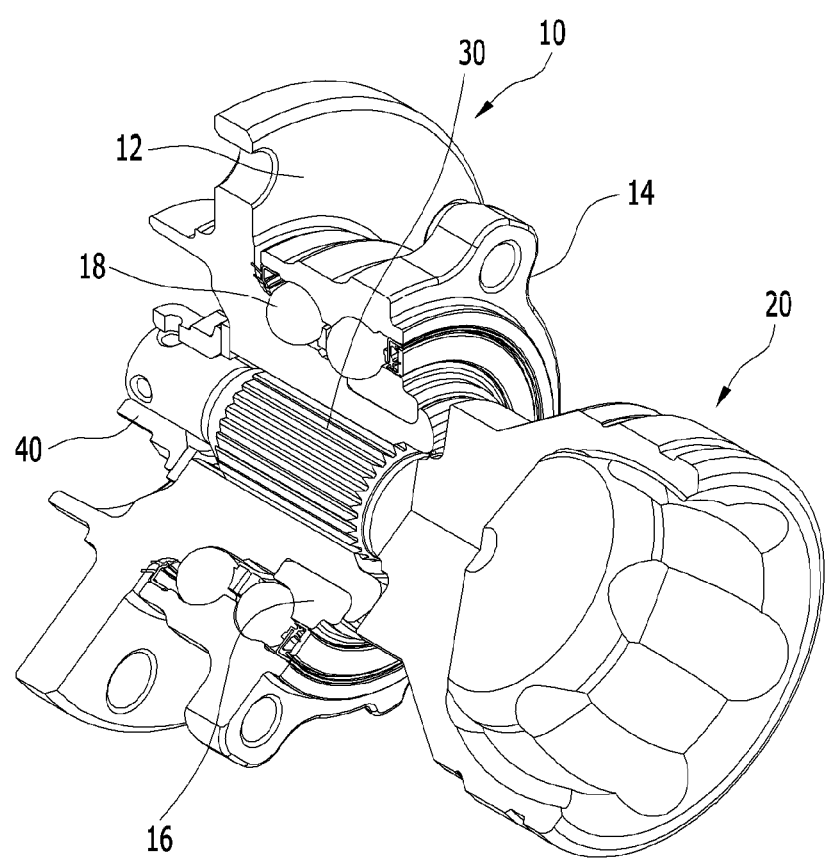
FIG. 1 is a cut-away perspective view of a drive wheel bearing in the related art.
Figure 2:
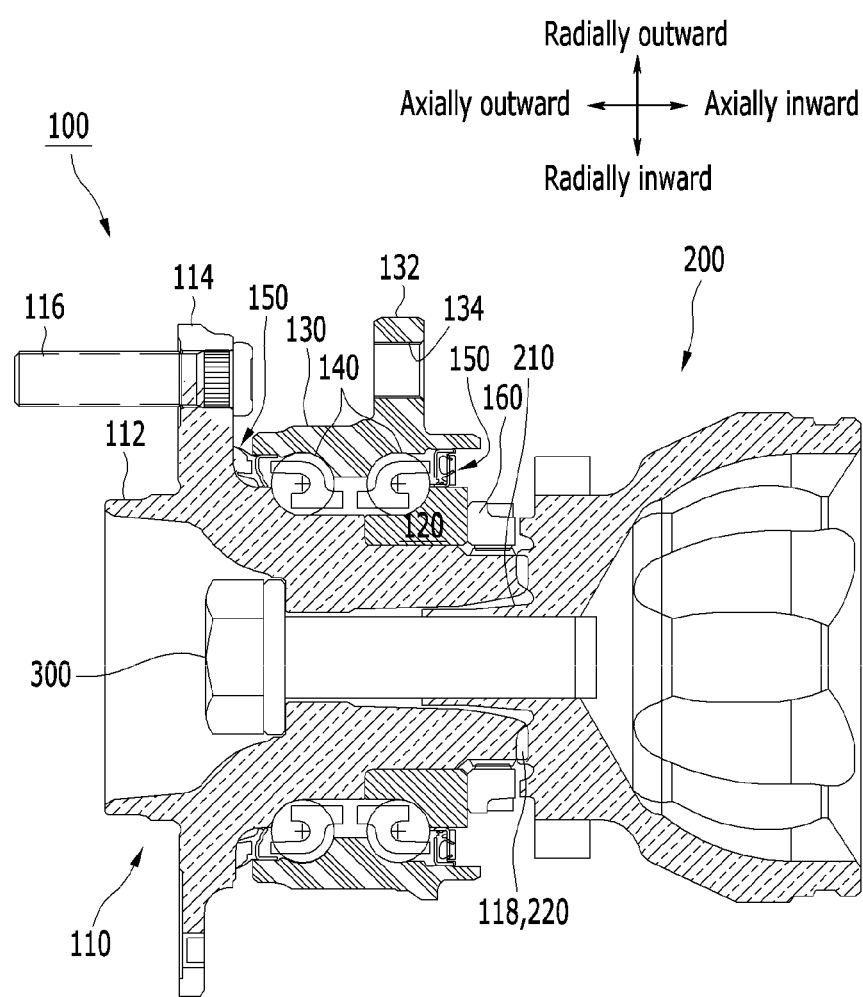
FIG. 2 is a cross-sectional view of a drive wheel bearing according to an exemplary embodiment of the present invention.

Referring to FIG. 2, a drive wheel bearing according to an exemplary embodiment of the present invention may include a wheel bearing 100 which mounts a non-illustrated vehicle wheel so that the vehicle wheel is rotatable relative to a vehicle body, and a constant velocity joint 200 which is a driving member that is coupled to a rotating element of the wheel bearing 100 and transmits power of an engine to the vehicle wheel through the rotating element of the wheel bearing 100.

The wheel bearing 100 may include a wheel hub 110 which is integrally and rotatably fastened to the vehicle wheel.

The wheel hub 110 may include a cylindrical portion which is opened at both opposite sides.

A pilot 112 is formed at an axially outer tip portion of the cylindrical portion of the wheel hub 110, and serves to guide assembling when coupled to the vehicle wheel.

A radially outward extending flange 114 is integrally formed on an outer circumferential surface of the cylindrical portion which is adjacent to the pilot 112, and a plurality of fastening holes is penetratively formed in the flange 114. As hub bolts 116 are inserted into the fastening holes and fastened to the vehicle wheel, the wheel hub 110 may be integrally and rotatably connected to the vehicle wheel.

The wheel bearing 100 may further include an inner race 120 which is coupled by being fitted with an outer circumferential surface of the cylindrical portion of the wheel hub 110 in an axial direction, and an outer race 130 which is positioned radially outside the wheel hub 110 and the inner race 120 so as to support the wheel hub 110 and the inner race 120 so that the wheel hub 110 and the inner race 120 are rotatable relative to the outer race 130, and fixedly fastened to a fixing body such as a vehicle body or a knuckle.

The outer race 130 includes a cylindrical portion which is opened at both opposite sides, a radially outward extending flange 132 is integrally formed on an outer circumferential surface of the cylindrical portion, and a fastening hole 134 is penetratively formed in the flange 132. As a fastening bolt is inserted through the fastening hole 134 and fastened to the vehicle body or the knuckle, the outer race 130 may be fixedly mounted so as not to be rotated.

The inner race 120 may also have a cylindrical shape opened at both opposite sides.

Inner raceways are formed in a part of the outer circumferential surface of the cylindrical portion of the wheel hub 110 and in a part of the outer circumferential surface of the inner race 120, respectively, and outer raceways are formed in an inner circumferential surface of the cylindrical portion of the outer race 130 which face the respective inner raceways. Rolling elements 140 having a ball shape may be inserted between the inner raceways and the outer raceway and then supported by a cage.

The rolling element 140 may of course be disposed in a single row, and may have a roller shape or a tapered roller shape in addition to the ball shape.

A seal 150 may be mounted by being inserted between the outer race 130 and the wheel hub 110 in order to prevent foreign substances from flowing into the wheel bearing 100 through a radial separation space formed between the wheel hub 110 and the outer race 130.

The seal 150 may also be mounted by being inserted between the outer race 130 and the inner race 120 in order to prevent foreign substances from flowing into the wheel bearing 100 through a radial separation space also formed between the outer race 130 and the inner race 120.

Two stepped portions, which are stepped radially inward, may be formed on the outer circumferential surface of the cylindrical portion of the wheel hub 110.

The stepped portions are coupled to the inner circumferential surface of the inner race 120 in a press-fit manner.

To prevent the inner race 120 and the wheel hub 110 from being axially separated from each other in a state in which the wheel hub 110 is coupled by being press-fitted into the inner race 120 as described above, screw threads are formed on an outer circumferential surface of an axially inner tip portion of the stepped portion of the wheel hub 110, and a nut 160 may be fastened to the screw threads.

A face spline 118 may be formed on an axially inner tip surface of the cylindrical portion of the wheel hub 110.

Figure 3:
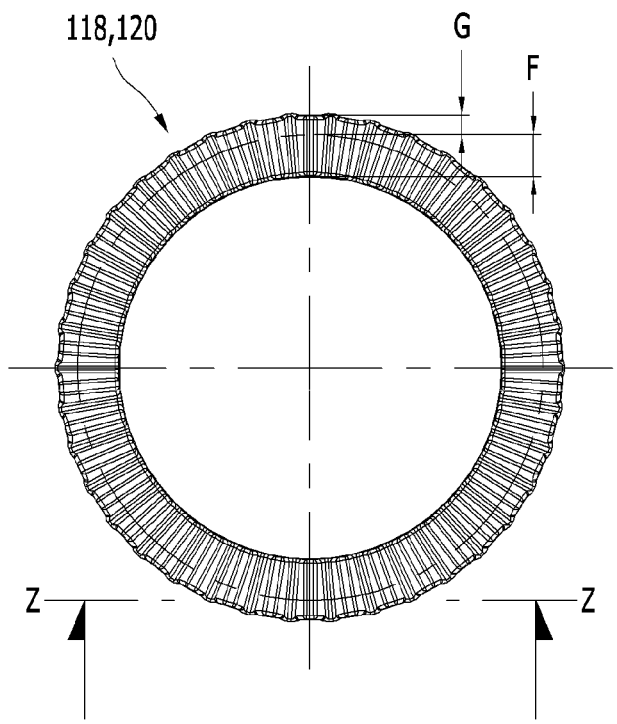
FIG. 3 is a front view of a face spline of a wheel hub and a constant velocity joint according to the exemplary embodiment of the present invention.
Figure 3:
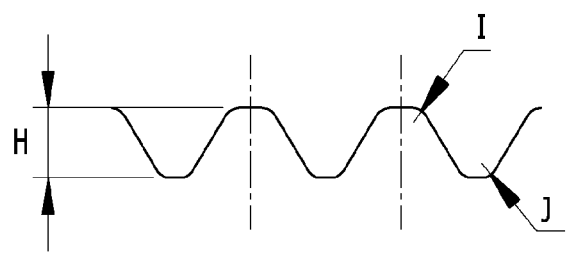

As illustrated in FIG. 3, the face spline 118 may have a structure in which teeth and tooth grooves radially extend, respectively, and the teeth and the tooth grooves are circumferentially, alternately, and continuously disposed.

The constant velocity joint 200 may be axially fitted and coupled through the cylindrical portion of the wheel hub 110.

The constant velocity joint 200 may have a mouth portion 210 which is inserted into the cylindrical portion of the wheel hub 110.

A fastening hole, which is recessed axially inward and has a threaded inner circumferential surface, may be formed in the mouth portion 210.

A fastening bolt 300 may be used to prevent the wheel hub 110 and the constant velocity joint 200 from being separated from each other in a state in which the mouth portion 210 of the constant velocity joint 200 is fitted with and coupled to the inner circumferential surface of the cylindrical portion of the wheel hub 110.

The fastening bolt 300 is inserted through the cylindrical portion of the wheel hub 110, and thread-fastened to the fastening hole of the mouth portion 210 of the constant velocity joint 200. A bolt head of the fastening bolt 300 is caught by an axially outer tip surface formed on the inner circumferential surface of the cylindrical portion, such that the fastening bolt 300 prevents the wheel hub 110 and the constant velocity joint 200 from being axially separated, and connectivity between the wheel hub 110 and the constant velocity joint 200 is improved.

When the constant velocity joint 200 is fitted with and coupled to the wheel hub 110, the constant velocity joint 200 may have an axially outer tip surface that faces the axially inner tip surface of the cylindrical portion of the wheel hub 110.

A face spline 220, which correspond to the face spline 118 of the wheel hub 110, may also be formed on the axially outer tip surface of the constant velocity joint 200.

As illustrated in FIG. 3, the face spline 220 of the constant velocity joint 200 may also have a structure in which teeth and tooth grooves radially extend, respectively, and the teeth and the tooth grooves are circumferentially, alternately, and continuously disposed.

Therefore, when the constant velocity joint 200 is coupled to the wheel hub 110, the teeth of the face spline 220 of the constant velocity joint 200 are inserted into and coupled to the tooth grooves of the face spline 118 of the wheel hub 110, and the teeth of the face spline 118 of the wheel hub 110 are inserted into and coupled to the tooth grooves of the face spline 220 of the constant velocity joint 200, and as a result, the wheel hub 110 and the constant velocity joint 200 may be coupled to be integrally rotatable in the circumferential direction.

Since the wheel hub 110 and the constant velocity joint 220 are integrally and rotatably coupled by means of the face spline 118 and 220 as described above, rotational power of the engine may be smoothly transmitted to the vehicle wheel through the constant velocity joint 200 via the wheel hub 110.

Figure 4:
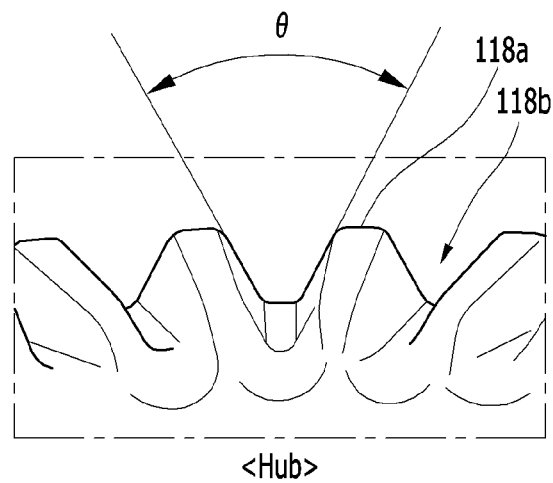
FIG. 4 is a partially cut-away perspective view of the face spline of the wheel hub and the constant velocity joint according to the exemplary embodiment of the present invention.
Figure 4:
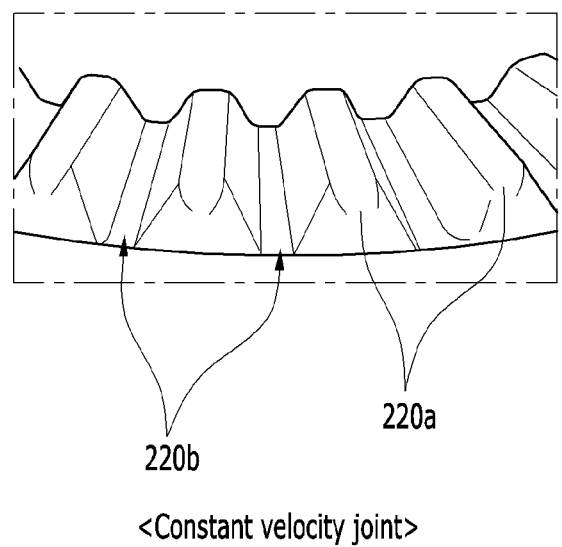

Referring to FIG. 4, the teeth 118a of the face spline 118 of the wheel hub 110 and the teeth 220a of the face spline 220 of the constant velocity joint 200 may be identically formed to have the same tooth width and the same tooth length.

In addition, the tooth grooves 118b of the face spline 118 of the wheel hub 110 and the tooth grooves 220b of the face spline 220 of the constant velocity joint 200 may also be identically formed to have the same width and the same length, such that the face spline 118 of the wheel hub 110 and the face spline 220 of the constant velocity joint 200 may mesh with each other without clearances.

Further, a pressure angle θ of each of the teeth 118a and 220a may be an angle of 30° to 45°.

Figure 5:
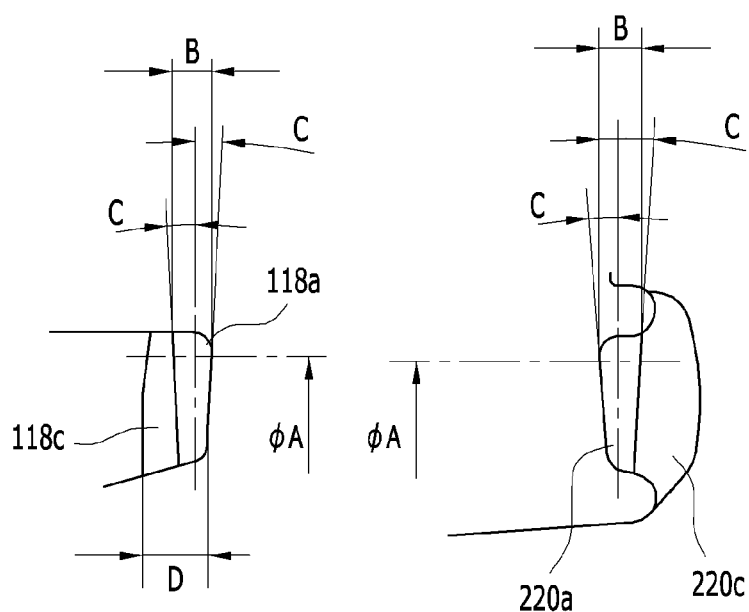
FIG. 5 is a side view of teeth of the face spline of the wheel hub and the constant velocity joint according to the exemplary embodiment of the present invention.
Figure 6:
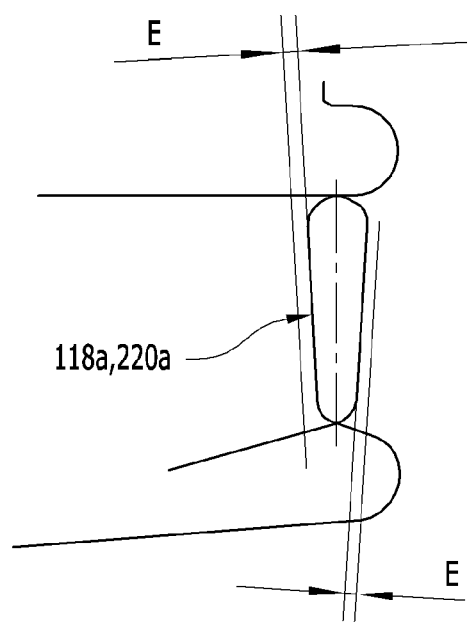
FIG. 6 is a side view illustrating a state in which the teeth of the face spline of the wheel hub and the constant velocity joint according to the exemplary embodiment of the present invention are coupled.

Referring to FIGS. 5 and 6, a tooth angle C of a top land of each of the teeth 118a and 220a with respect to a vertical axis of each of the teeth 118a and 220a and a tooth angle C of a bottom land of each of the teeth with respect to the vertical axis may be an angle of 0.5° to 5.0°.

Further, in a case in which the pressure angle θ of each of the teeth 118a and 220a is 30° to 45°, and the tooth angle C is 0.5° to 5.0°, a tooth groove depth B of each of the tooth grooves may be 1.0 mm to 3.0 mm.

In addition, a radially outer portion of the tooth 118a or 220a is a portion that the highest force is applied when the face spline is rotated. Therefore, as illustrated in FIG. 3, the teeth may be formed such that a tooth height H is 2 mm or greater in a section from a portion, where a tooth length ratio F/G which is a ratio between a tooth length F from a radially inner end of the tooth 118a or 220a to a predetermined point along a tooth length in a radially outward direction and a tooth length G from the predetermined point to a radially outer end along a tooth length is 1.5 or more, to the radially outer end of the tooth.

Furthermore, appropriate curved surfaces are formed at a ridge I and a trough J of each of the teeth 118a and 220a, and a radius of curvature R of the curved surface may be up to 0.7 mm or smaller.

In addition, the teeth and the tooth grooves may be formed such that a gap E between the tooth of the face spline 118 of the wheel hub 110 or the constant velocity joint 200 and a bottom surface of the tooth groove of the face spline 220 of the constant velocity joint 200 of the wheel hub 110 is 0.2 mm to 0.7 mm in a state in which the tooth of the face spline 118 of the wheel hub 110 and the tooth of the face spline 220 of the constant velocity joint are inserted into and coupled to the tooth groove of the face spline of the constant velocity joint and the tooth groove of the face spline of the wheel hub, respectively.

Further, face spline portions including the teeth 118a and 220a and the tooth grooves 118b and 220b may have hardened portions 118c and 220c formed through an appropriate heat treatment, thereby improving hardness and durability.

The hardened portions 118c and 220c are heat treated to have Rockwell hardness of about 30 to 60 HRC, and the hardened portions 118c and 220c may be heat treated such that a hardening depth D is up to 4 mm, an effective hardening depth is 2.5 mm to 4 mm, and a hardening depth at a trough is 2 mm or greater.

Since the hardened portion having an appropriate hardness and depth is formed at the face spline as described above, it is possible to maintain stable tooth strength.

The limitation matters such as the pressure angle of each of the teeth, the tooth angle, the tooth groove depth, and so on, may be equally applied to the face spline of the inner race.

Figure 7:
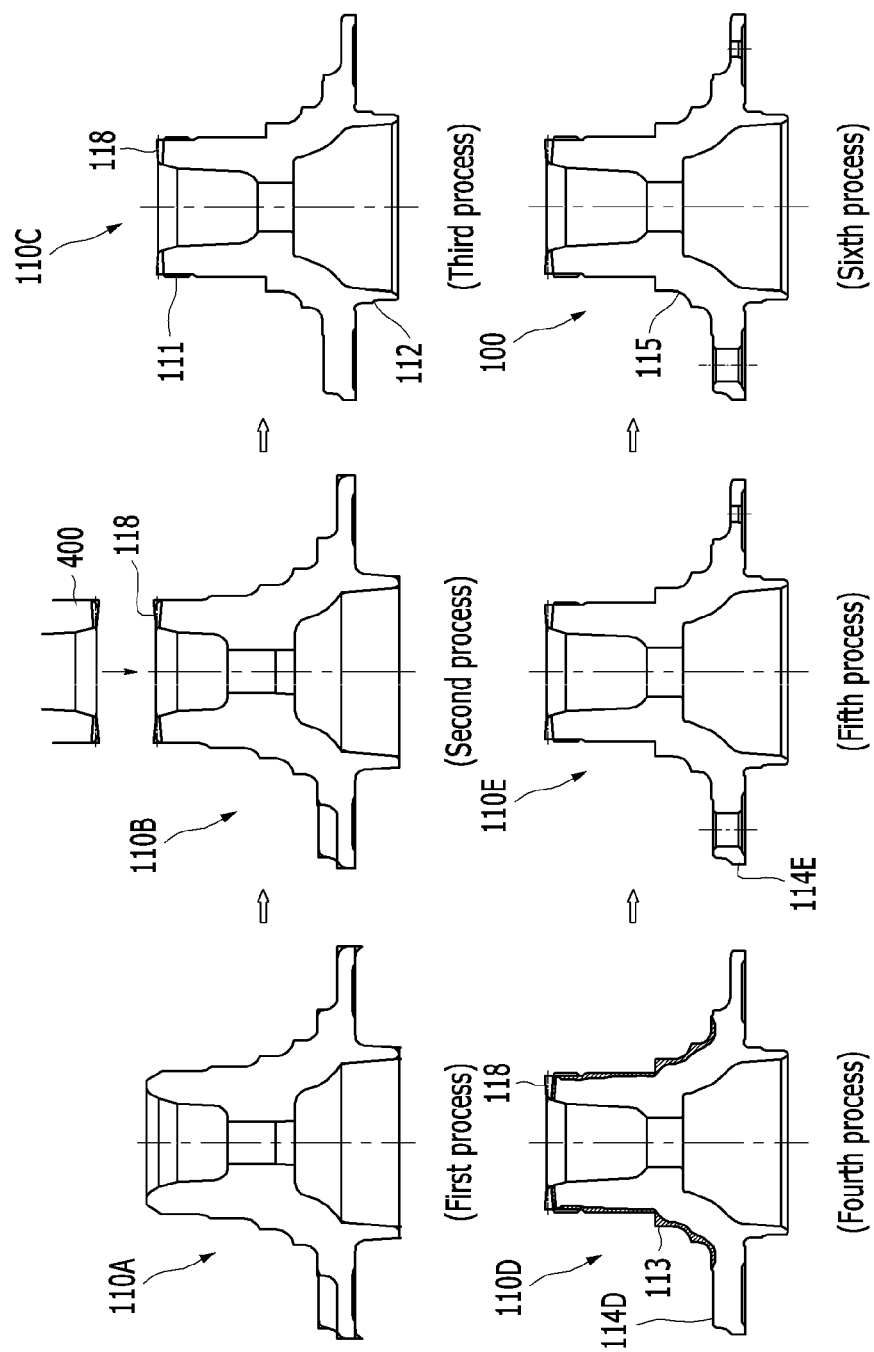
FIG. 7 is a view illustrating a manufacturing process of the wheel hub according to the exemplary embodiment of the present invention.

Referring to FIG. 7, the wheel hub 110 may be manufactured through the following first to sixth processes.

In a first process (hot forging process), a firstly preformed wheel hub 110A may be manufactured by heating a material such as high carbon steel at an appropriate temperature and forming the material by using a hot forging die.

The firstly preformed wheel hub 110A may include the radially extending flange, and the cylindrical portion opened at both opposite sides.

In a second process (cold forging process), a secondly preformed wheel hub 110B may be manufactured by forming the face spline 118 having the teeth and the tooth grooves on one tip surface of the cylindrical portion of the firstly preformed wheel hub 110A.

In the second process, the secondly preformed wheel hub 110B may be formed by using a cold forging die 400.

In a third process (turning machining process before heat treatment), a thirdly preformed wheel hub 110C may be manufactured by forming a threaded portion 111, to which the nut 160 illustrated in FIG. 2 may be fastened, on an outer circumferential surface of the secondly preformed wheel hub 110B, and then performing turning machining on an inner circumferential surface of the pilot 112 of the cylindrical portion.

In a fourth process (high frequency heat treatment process), a fourthly preformed wheel hub 110D may be manufactured by heat treating an outer circumferential surface of the thirdly preformed wheel hub 110C, for example, through a high frequency heat treatment, in order to improve hardness and strength.

As the heat treatment in the fourth process, other heat treatment methods may be performed in addition to the high frequency heat treatment.

The heat treatment of the fourth process is performed on the face spline 118 and a portion from the outer circumferential surface of the cylindrical portion to a part of a flange 114D in the axial direction, and as a result, the hardened portion 113 may be formed on the outer circumferential surface of the cylindrical portion as indicated by hatched regions.

Next, in a fifth process (turning machining, drilling and tapping process after heat treatment), a fifthly preformed wheel hub 110E may be manufactured by drilling for forming a fastening hole that penetrates a flange 114E, tapping for forming screw threads in the fastening hole, and turning machining for machining an outer circumferential surface of the pilot 112, a stepped press-fit portion of the inner race 120, and a part of an inner circumferential surface of the cylindrical portion of the wheel hub into which the constant velocity joint 200 is fitted.

Finally, in a sixth process (inner raceway grinding and finishing process), the wheel hub 110 is manufactured by grinding the inner raceway 115, on which the rolling element 140 is seated and supported, on the outer circumferential surface of the wheel hub, and superprecisely finishing the inner raceway 115.

Figure 8:
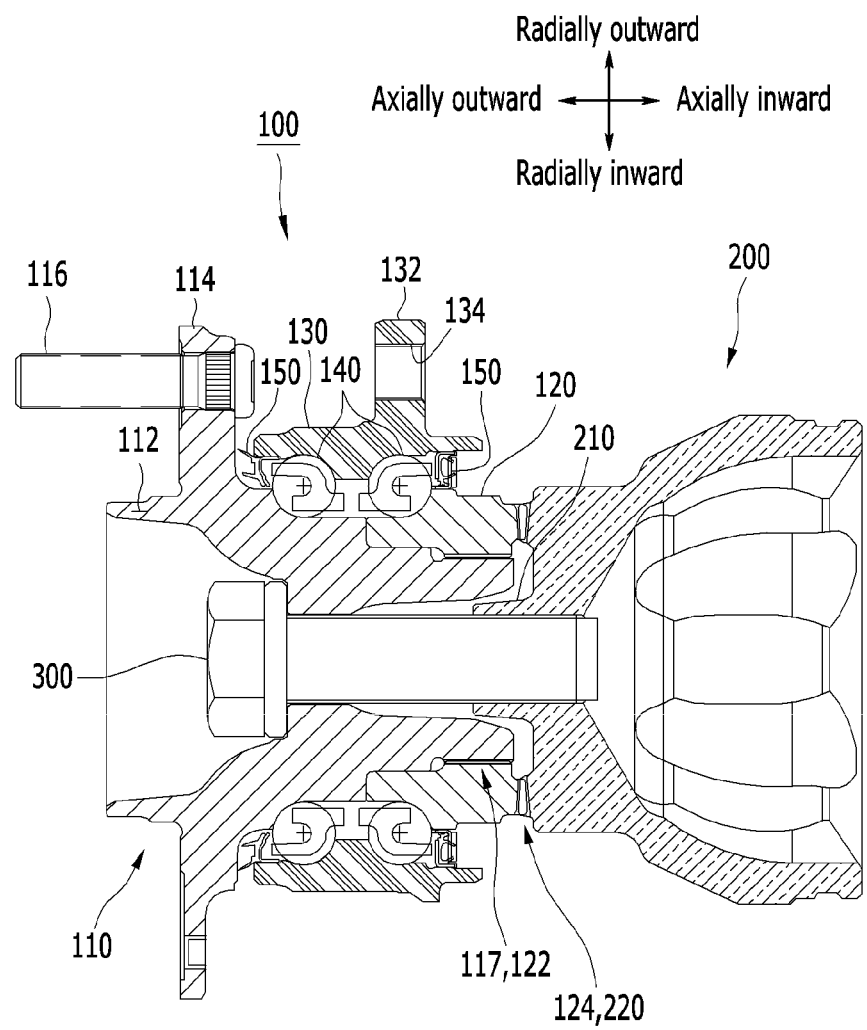
FIG. 8 is a cross-sectional view of a drive wheel bearing according to another exemplary embodiment of the present invention.

Referring to FIG. 8, a drive wheel bearing according to another exemplary embodiment of the present invention differs from the drive wheel bearing in the above exemplary embodiment in that the inner race 120 and the constant velocity joint 200 are integrally and rotatably coupled by means of the face spline 124 and 220.

In addition, another exemplary embodiment differs from the above exemplary embodiment in that the inner race 120 and the wheel hub 110 are integrally and rotatably coupled by means of the axial spline 117 and 122.

A stepped portion, which is stepped radially inward, may be formed on the outer circumferential surface of the cylindrical portion positioned axially inside the wheel hub 110, and the axial spline 117 of the wheel hub 110 may be formed on the stepped portion.

The axial spline 117 of the wheel hub 110 may include teeth and tooth grooves which are formed on the stepped portion so as to extend axially.

The teeth and the tooth grooves may be alternately disposed in the circumferential direction.

The stepped portion of the wheel hub 110 is coupled to the inner circumferential surface of the inner race 120 in a press-fit manner, and the axial spline 122, which correspond to the axial spline 117 of the wheel hub 110, may be formed on the inner circumferential surface of the inner race 120.

The axial spline 122 of the inner race 120 may include teeth and tooth grooves which are formed on the inner circumferential surface of the inner race 120 so as to extend axially.

The teeth and the tooth grooves may be alternately disposed in the circumferential direction.

When the stepped portion of the wheel hub 110 is coupled to the inner circumferential surface of the inner race 120 in a press-fit manner, the teeth of the axial spline 117 of the wheel hub 110 are inserted into the tooth grooves of the axial spline 122 of the inner race 120, and the teeth of the axial spline 122 of the inner race 120 are inserted into the tooth grooves of the axial spline 117 of the wheel hub 110, such that the wheel hub 110 and the inner race 120 are coupled to be integrally rotatable in the circumferential direction.

The face spline 124 of the inner race 120 may include teeth and tooth grooves which are formed to extend radially outward, and alternately disposed in the circumferential direction.

The teeth of the face spline 124 of the inner race 120 are inserted into the tooth grooves of the face spline 220 of the constant velocity joint 200, and the teeth of the face spline 220 of the constant velocity joint 200 are inserted into the tooth grooves of the face spline 124 of the inner race 120, such that the inner race 120 and the constant velocity joint 200 are coupled to be integrally rotatable in the circumferential direction.

Figure 9:
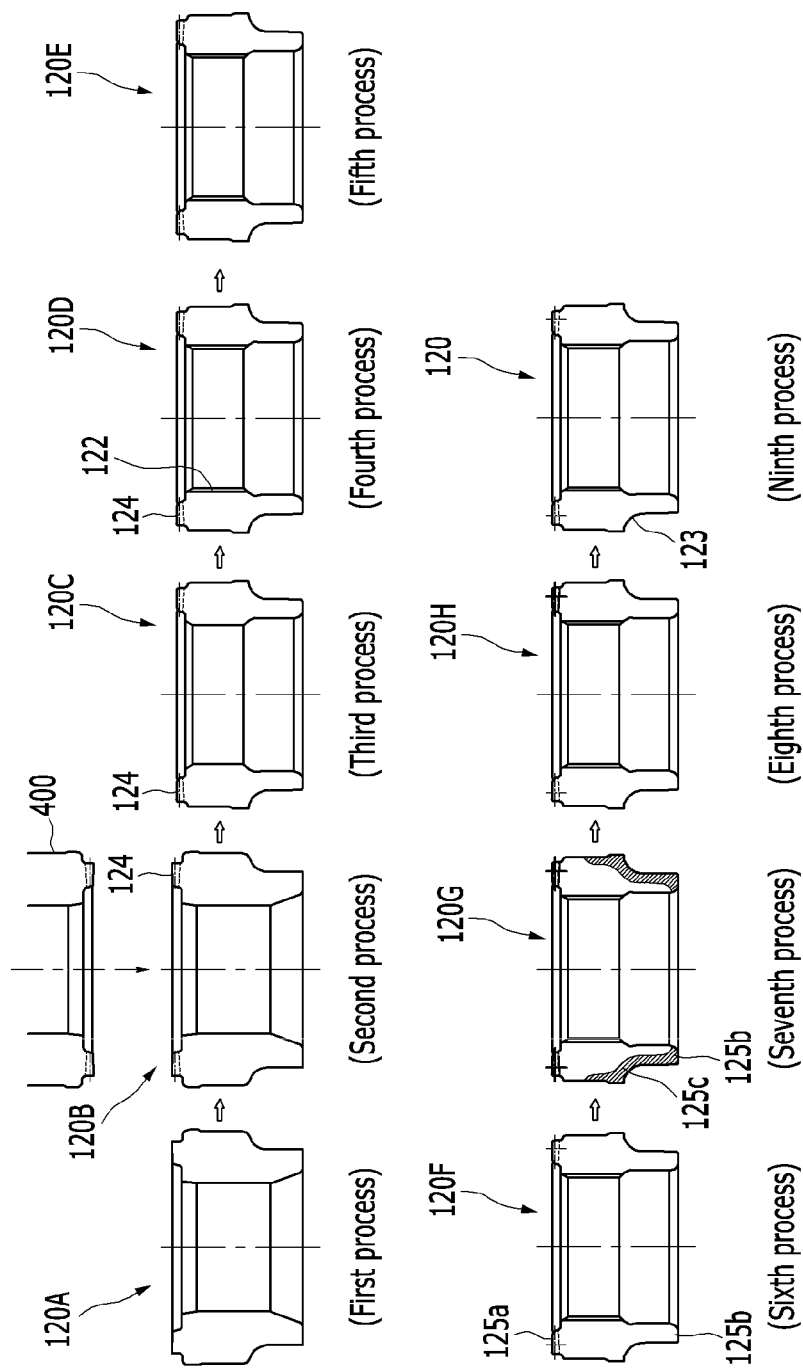
FIG. 9 is a view illustrating a manufacturing process of an inner race according to another exemplary embodiment of the present invention.

Referring to FIG. 9, the inner race 120 illustrated in FIG. 8 may be manufactured through the following first to ninth processes.

In a first process (hot forging process), a firstly preformed inner race 120A may be manufactured by heating a material such as high carbon steel at an appropriate temperature and then forming the material by using a hot forging die.

The firstly preformed inner race 120A may include a cylindrical portion opened at both opposite sides.

In a second process (face spline cold forging process), a secondly preformed inner race 120B may be manufactured by forming the face spline 124 having the teeth and the tooth grooves on one tip surface of the cylindrical portion of the firstly preformed inner race 120A.

The second process may be performed by cold forging by using a cold forging die 400.

In a third process (turning machining process before heat treatment), a thirdly preformed inner race 120C may be manufactured by performing turning machining, based on design dimensions, on the inner circumferential surface and the outer circumferential surface of the cylindrical portion which are positioned opposite to the face spline 124 of the secondly preformed inner race 120B.

In a fourth process (broaching process), a fourthly preformed inner race 120D may be manufactured by broaching the axial spline 122 on the inner circumferential surface of the thirdly preformed inner race 120C.

In a fifth process (heat treatment process), a fifthly preformed inner race 120E may be manufactured by heating an overall portion of the fourthly preformed inner race 120D at an appropriate temperature and then cooling the overall portion of the fourthly preformed inner race 120D through quenching and a tempering heat treatment in order to improve strength, hardness, and toughness of the inner race.

In a sixth process (width grinding process), a sixthly preformed inner race 120F may be manufactured by performing width flat surface grinding on the inner race in order to ensure flatness of a large end surface 125a of the inner race, that is, the face spline 124, and a small end surface 125b.

In a seventh process (high frequency heat treatment process), a seventhly preformed inner race 120G may be manufactured by performing high frequency heat treatment on the outer circumferential surface of the inner race, that is, the outer circumferential surface that includes the small end surface 125b and is directed toward the large end surface 125a from the outer circumferential surface of the small end surface 125b as indicated by hatched regions, and forming a hardened portion 125c with improved hardness.

In the seventh process, the hardened portion 125c may be formed by performing the heat treatment by other appropriate methods in addition to the high frequency heat treatment.

In an eighth process (inner diameter grinding process), an eighthly preformed inner race 120H may be manufactured by grinding the inner circumferential surface of the cylindrical portion of the inner race such that an inner diameter of the inner race has a design dimension.

The spline may be reprocessed by using a broaching tool made of a special material in the eighth process in order to prevent thermal deformation of a spline portion of the inner race caused by the heat treatments in the fifth and seventh processes.

Finally, in a ninth process (inner raceway grinding and finishing process), the inner race 120 may be manufactured by grinding the inner raceway 123, on which the rolling element 140 is seated and supported, on the outer circumferential surface between the small end surface 125b and the large end surface 125a of the inner race, and superprecisely finishing the inner raceway 123.

Figure 10:
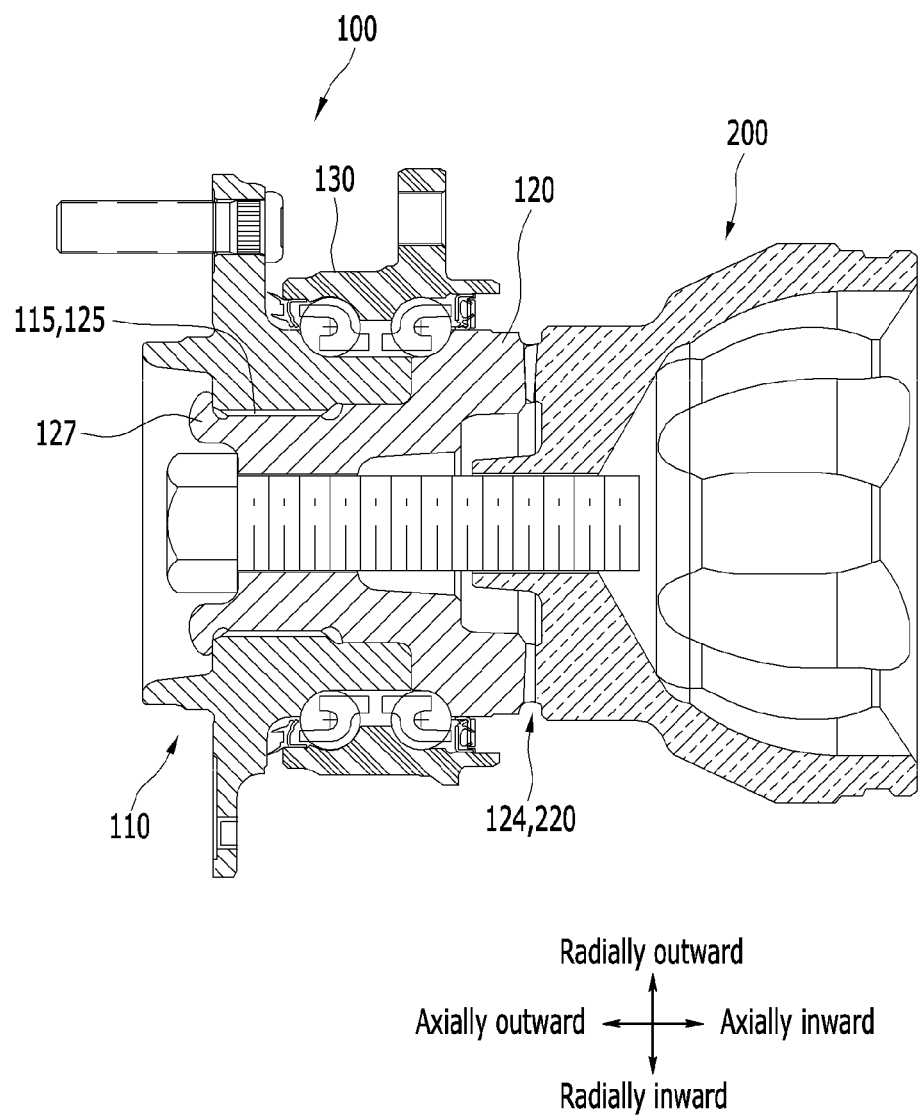
FIG. 10 is a cross-sectional view of a drive wheel bearing according to yet another exemplary embodiment of the present invention.

Referring to FIG. 10, in a drive wheel bearing according to yet another exemplary embodiment of the present invention, the inner race 120 extends axially further than the inner races in the above the exemplary embodiments, the inner race 120 is press-fitted into the cylindrical portion of the wheel hub 110 such that the wheel hub 110 and the inner race 120 are integrally and rotatably connected by means of the axial spline 115 and 124, and an orbital forming portion 127 is formed on the axially outer tip surface of the inner race 120 so as to be bent radially outward, thereby preventing the inner race 120 and the wheel hub 110 from being separated axially.

In addition, a stepped portion, which extends axially adjacent to the axial spline 125 and extends radially outward, is formed on the outer circumferential surface of the inner race 120, and the stepped portion comes into close contact with the inner circumferential surface of the wheel hub 110 and the axially inner tip surface of the wheel hub 110 when the inner race 120 is coupled to the wheel hub 110 in a press-fit manner.

The structure in which the face spline 124 is formed on the axially inner tip surface opposite to the orbital forming portion 127, and mesh with the face spline 220 of the constant velocity joint 200 is the same as the structure in the above exemplary embodiment.

Figure 11:
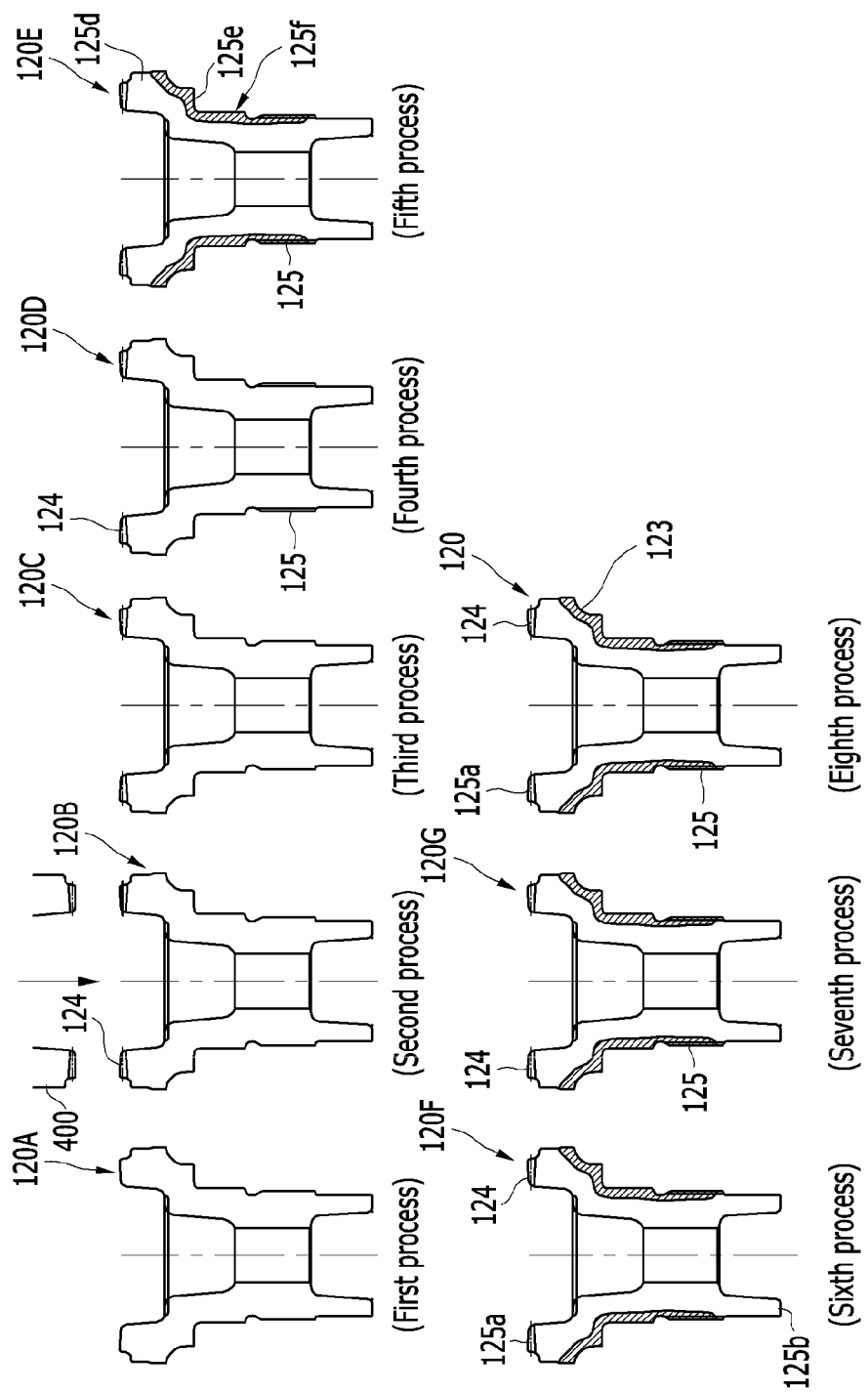
FIG. 11 is a view illustrating a manufacturing process of an inner race according to yet another exemplary embodiment of the present invention.

Referring to FIG. 11, the inner race 120 illustrated in FIG. 10 may be manufactured through the following first to eighth processes.

In a first process (hot forging process), a firstly preformed inner race 120A may be manufactured by heating a material such as high carbon steel at an appropriate temperature and then forming the material by using a hot forging die.

The firstly preformed inner race 120A may include a cylindrical portion opened at both opposite sides.

In a second process (face spline cold forging process), a secondly preformed inner race 120B may be manufactured by forming the face spline 124 having the teeth and the tooth grooves on one tip surface of the cylindrical portion of the firstly preformed inner race 120A.

The second process may be performed by cold forging by using a cold forging die 400.

In a third process (turning machining process before heat treatment), a thirdly preformed inner race 120C may be manufactured by performing turning machining, based on design dimensions, on the inner circumferential surface and the outer circumferential surface of the cylindrical portion which are positioned opposite to the face spline 124 of the secondly preformed inner race 120B.

In a fourth process (rolling process), a fourthly preformed inner race 120D may be manufactured by processing the axial spline 125, through a rolling process, on the outer circumferential surface of the thirdly preformed inner race 120C.

In a fifth process (high frequency heat treatment process), a fifthly preformed inner race 120E may be manufactured by performing high frequency heat treatment on the outer circumferential surface of the inner race, that is, a portion as indicated by hatched regions from an outer circumferential surface of a larger diameter portion 125d of the inner race 120 to an outer circumferential surface where the stepped portion 125e and the axial spline 125 are formed, and forming the hardened portion 125f with improved hardness.

In a sixth process (finish grinding process after heat treatment), a sixthly preformed inner race 120F may be manufactured by finish grinding, based on design dimensions, a deformed portion after the heat treatment of the inner circumferential surface and the outer circumferential surface of the inner race after the heat treatment in the fifth process.

In a seventh process (width grinding process), a seventhly preformed inner race 120G may be manufactured by performing width flat surface grinding on the inner race in order to ensure flatness of the large end surface 125a of the inner race, that is, the face spline 124, and the small end surface 125b.

Finally, in an eighth process (process of grinding and finishing an inner diameter of the inner race and the inner raceway), the inner race 120 may be manufactured by grinding the inner raceway 123, on which the rolling element 140 is seated and supported, on the outer circumferential surface between the small end surface 125b and the large end surface 125a of the inner race, and superprecisely finishing the inner raceway 123.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a drive wheel bearing, the method comprising:
   a first step of forming a firstly preformed inner race having a cylindrical portion opened at opposite sides;
   a second step of forming a secondly preformed inner race by forming a face spline having teeth and tooth grooves on one tip surface of the cylindrical portion of the firstly preformed inner race;
   a third step of forming a thirdly preformed inner race by performing turning machining on an inner circumferential surface and an outer circumferential surface of the cylindrical portion which are positioned at the opposite side to the face spline of the secondly preformed inner race;

a fourth step of forming a fourthly preformed inner race by broaching axial spline on the inner circumferential surface of the thirdly preformed inner race;

a fifth step of forming a fifthly preformed inner race by improving strength, hardness, and toughness by heat treating the fourthly preformed inner race;

a sixth step of forming a sixthly preformed inner race by performing width flat surface grinding in order to ensure flatness of a large end surface and a small end surface of the cylindrical portion;

a seventh step of forming a seventhly preformed inner race by forming a hardened portion on the outer circumferential surface of the cylindrical portion through a heat treatment;

an eighth step of forming an eighthly preformed inner race by grinding the inner circumferential surface of the cylindrical portion; and a ninth step of grinding an inner raceway on the cylindrical portion and superprecisely finishing the inner raceway.

2. The method of claim 1, wherein:

the eighth step includes reprocessing the splines by using a broaching tool made of a special material in order to prevent thermal deformation of a spline portion of the inner race caused by the heat treatments of the fifth and seventh steps.

* * * * *